(12) United States Patent
Walenty et al.

(10) Patent No.: US 6,405,117 B1
(45) Date of Patent: Jun. 11, 2002

(54) METHOD OF DIAGNOSING A VEHICLE BRAKE SYSTEM USING BRAKE PEDAL POSITION AND VEHICLE DECELERATION

(75) Inventors: Allen John Walenty, Macomb; Kevin Gerard Leppek, Rochester Hills; David Alan Thatcher, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/885,191

(22) Filed: Jun. 21, 2001

(51) Int. Cl.⁷ .............................. G06G 7/76; G06F 19/00
(52) U.S. Cl. .............................. 701/70; 701/29; 701/35; 73/121; 73/129
(58) Field of Search .............................. 701/29, 30, 33, 701/35, 36, 34, 70, 71, 74, 75; 73/121, 117.1, 118.1, 129

(56) References Cited

U.S. PATENT DOCUMENTS

| 5,541,840 A | * | 7/1996 | Gurne et al. ................... 701/33 |
| 6,181,992 B1 | * | 1/2001 | Gurne et al. ................... 701/29 |
| 6,212,458 B1 | | 4/2001 | Walenty et al. ............... 701/51 |
| 6,332,354 B1 | * | 12/2001 | Lalor et al. ................... 701/70 |

* cited by examiner

Primary Examiner—Gertrude Arthur
(74) Attorney, Agent, or Firm—Christopher DeVries (57) ABSTRACT

An improved method of diagnosing conditions of a vehicle braking system that degrade the braking effectiveness informs the driver of the condition so that repair or adjustment can be timely made. The relationship between brake pedal position and vehicle deceleration is determined during a calibration interval to construct a calibration table of brake effectiveness, and then periodically over the life of the braking system to develop a current brake effectiveness table. Braking system abnormalities that impair the braking effectiveness are diagnosed by analyzing the table values.

21 Claims, 6 Drawing Sheets

METHOD OF DIAGNOSING A VEHICLE BRAKE SYSTEM USING BRAKE PEDAL POSITION AND VEHICLE DECELERATION

TECHNICAL FIELD

This invention relates to motor vehicle brake systems, and more particularly to a method of using measured brake pedal position and vehicle deceleration to diagnose brake system abnormalities.

BACKGROUND OF THE INVENTION

The effectiveness of a vehicle braking system can change dramatically over time due to brake wear, fading and poor adjustment, and system abnormalities such as hydraulic leaks and air in the brake lines. Since the changes in braking effectiveness may go unnoticed by the driver, some sort of diagnostic logic is desired to inform the driver that a repair or adjustment of the braking system is needed.

SUMMARY OF THE INVENTION

The present invention is directed to an improved method of diagnosing conditions of a vehicle braking system that degrade the braking effectiveness, and informing the driver of the condition so that repair or adjustment can be timely made. According to the invention, the relationship between brake pedal position and vehicle deceleration is determined during a calibration interval to construct a calibration table of braking effectiveness, and then periodically over the life of the braking system to develop a current braking effectiveness table. Braking system abnormalities that impair the braking effectiveness are diagnosed by analyzing the table values. In the illustrated embodiment, non-adjusted rear brakes are detected by comparing a front-to-rear wheel speed difference with a pedal position dependent threshold, leaking brake fluid and brake fading are detected by comparing an actual vehicle deceleration with a vehicle deceleration expected based on the calibration table, and brake wear is detected by comparing current table values with calibration table values.

DESCRIPTION OF THE PREFERRED EMBODIMENT

Figure 1:
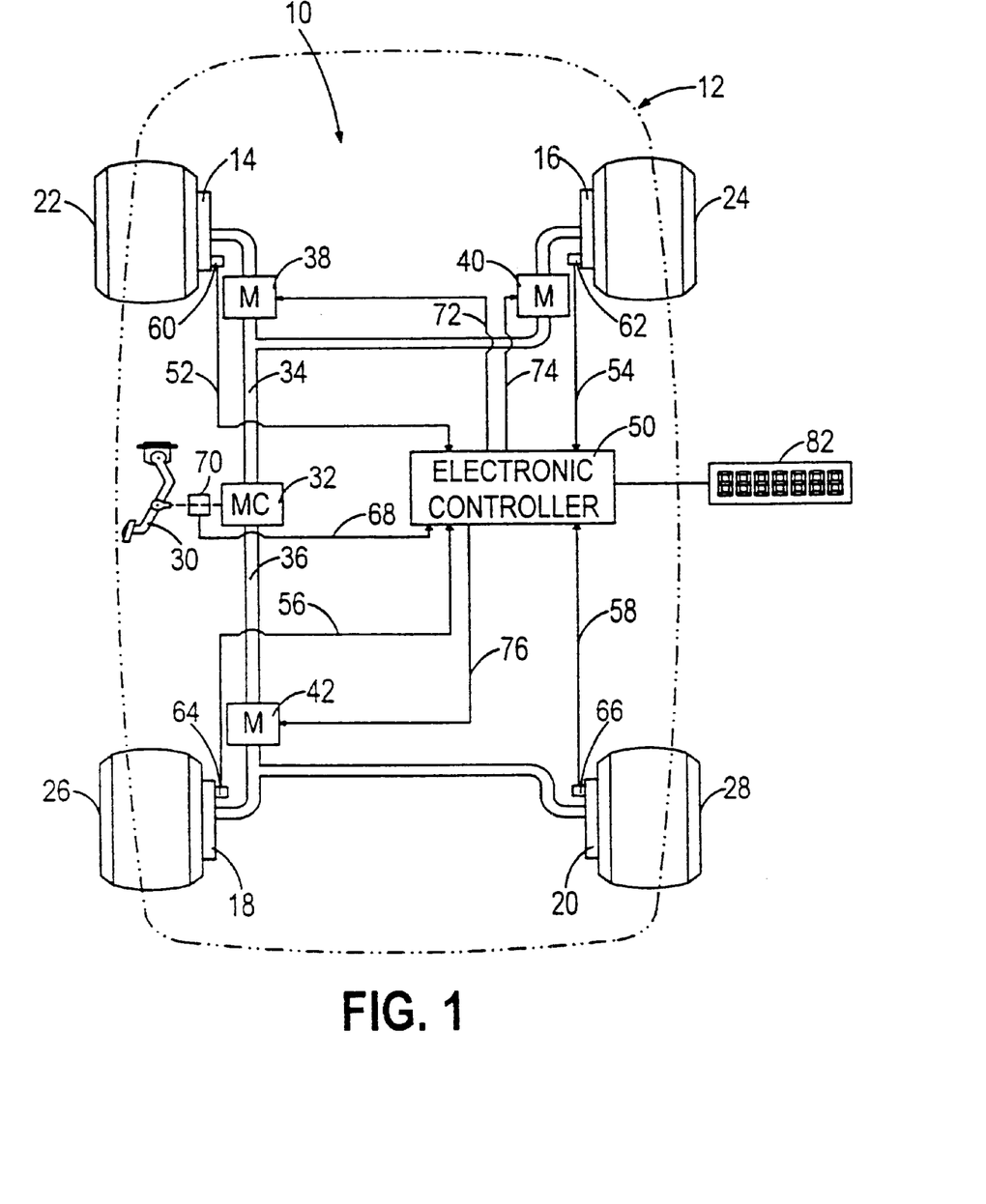
FIG. 1 is a schematic diagram of a vehicle braking system, including a brake pedal position sensor, and a microprocessor-based control unit programmed to carry out the diagnostic method of this invention.

Referring to FIG. 1, the present invention is disclosed in the context of an anti-lock braking system 10 for a vehicle 12 having hydraulically-activated friction brakes 14, 16, 18, 20 at each of four vehicle wheels 22, 24, 26, 28. In mechanizations where the rear brakes 18, 20 are drum brakes, a self-adjusting mechanism (not shown) is included to compensate for brake shoe wear during braking while the vehicle 12 is backing up. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front antilock modulator (M) 38, and to the right front service brake 16 via right-front antilock modulator (M) 40. Rear supply line 36 is coupled to the left and right rear wheel brakes 18, 20 via rear antilock modulator (M) 42.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64, 66 and 70 may be implemented with conventional devices in a manner known to those skilled in the art. In response to the various inputs, the control unit 50 outputs modulator control signals on lines 72, 74, 76 during wheel lock-up conditions and diagnostic information signals on line 80 for display on a driver information device 82.

Figure 2:
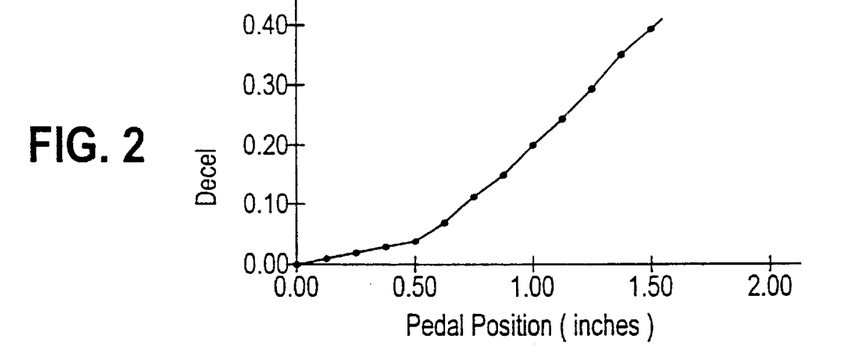
FIG. 2 is a graph depicting vehicle deceleration as a function of brake pedal position for the braking system of FIG. 1.

The present invention is directed to a method of diagnosing conditions of braking system 10 that degrade braking effectiveness, and informing the driver of the condition via driver information device 82 to ensure timely repair or adjustment of braking system 10. In general, the diagnostic method involves determining a base or calibration relationship between brake pedal position and vehicle deceleration for defined vehicle braking operation, periodically determining a current relationship, and diagnosing the condition of the braking system 10 based on the current and calibration relationships. FIG. 2 graphically depicts a representative relationship between vehicle deceleration and brake pedal position for defined braking of the vehicle 12, assuming that there is no lock-up condition and the modulators 38, 40, 42 are inactive. Typically, the "knee" portion of the relationship varies considerably from stop to stop, whereas the portion of the relationship above the knee tends to be linear and repeatable from stop to stop. For this reason, the knee portion of the relationship is ignored for purposes of this invention, and the braking data collection only occurs for pedal positions and vehicle decelerations in the linear portion above the knee. In the illustrated embodiment, for example, the data collection is carried out by determining the pedal position corresponding to three different vehicle deceleration values identified in FIG. 2 as D1, D2 and D3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 nor during panic braking. This eliminates the need to compensate for the effects of suspension and powertrain dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see, for example, U.S. Pat. No.

Figure 3:
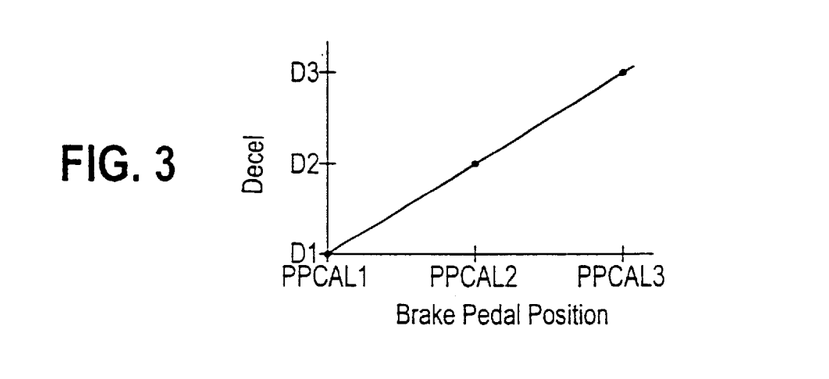
FIG. 3 is a graph depicting exemplary calibration brake effectiveness table data developed by the control unit of FIG. 1 according to this invention.

6,212,458 to Walenty et al., issued on Apr. 3, 2001, and incorporated herein by reference. FIG. 3 graphically depicts representative calibration table data for the vehicle 12, whereas FIG. 4 graphically depicts representative current table data. It will be noted that the pedal position values stored in the calibration table are identified as PPCAL1, PPCAL2 and PPCAL3, whereas the pedal position values stored in the current brake effectiveness table are identified as PPCUR1, PPCUR2 and PPCUR3.

Once the calibration and current data tables have been constructed, a series of diagnostic tests are carried out to identify degraded braking effectiveness and the likely cause. In general, the calibration table is used to define an expected vehicle deceleration for any brake pedal position above the minimum pedal position table entry. When the actual vehicle deceleration (compensated for grade, weight, etc.) is much lower than the expected value, hydraulic leaking, brake fading or air in the brake lines is indicated. Of these conditions, the estimated brake heating is used to distinguish brake fading from hydraulic leaks and air in the hydraulic brake lines. Non-adjustment of the rear brakes 18, 20 is detected by computing a speed difference SPD_DELTA between the front and rear wheels and comparing it to a pedal position-dependent threshold. If the speed difference exceeds the threshold by a calibration amount for at least a predefined time interval, poor adjustment of the rear brakes 18, 20 is indicated. Additionally, brake wear is detected by comparing the brake pedal positions in the current table with the corresponding pedal positions in the calibration table.

The flow diagram of FIGS. 5–8 depicts a software routine that is periodically executed by control unit 50 of FIG. 1 whenever the brake pedal 30 is depressed for carrying out the diagnostic method of this invention. In general, the flow diagram comprises an input processing block 90, a leak/fade detection portion consisting of blocks 96–116, a data collection portion consisting of blocks 120–126 and 150–174, a rear brake adjustment test consisting of blocks 130–146, a brake wear test consisting of blocks 180–216, and a condition warning portion consisting of blocks 218–220.

Figure 5:
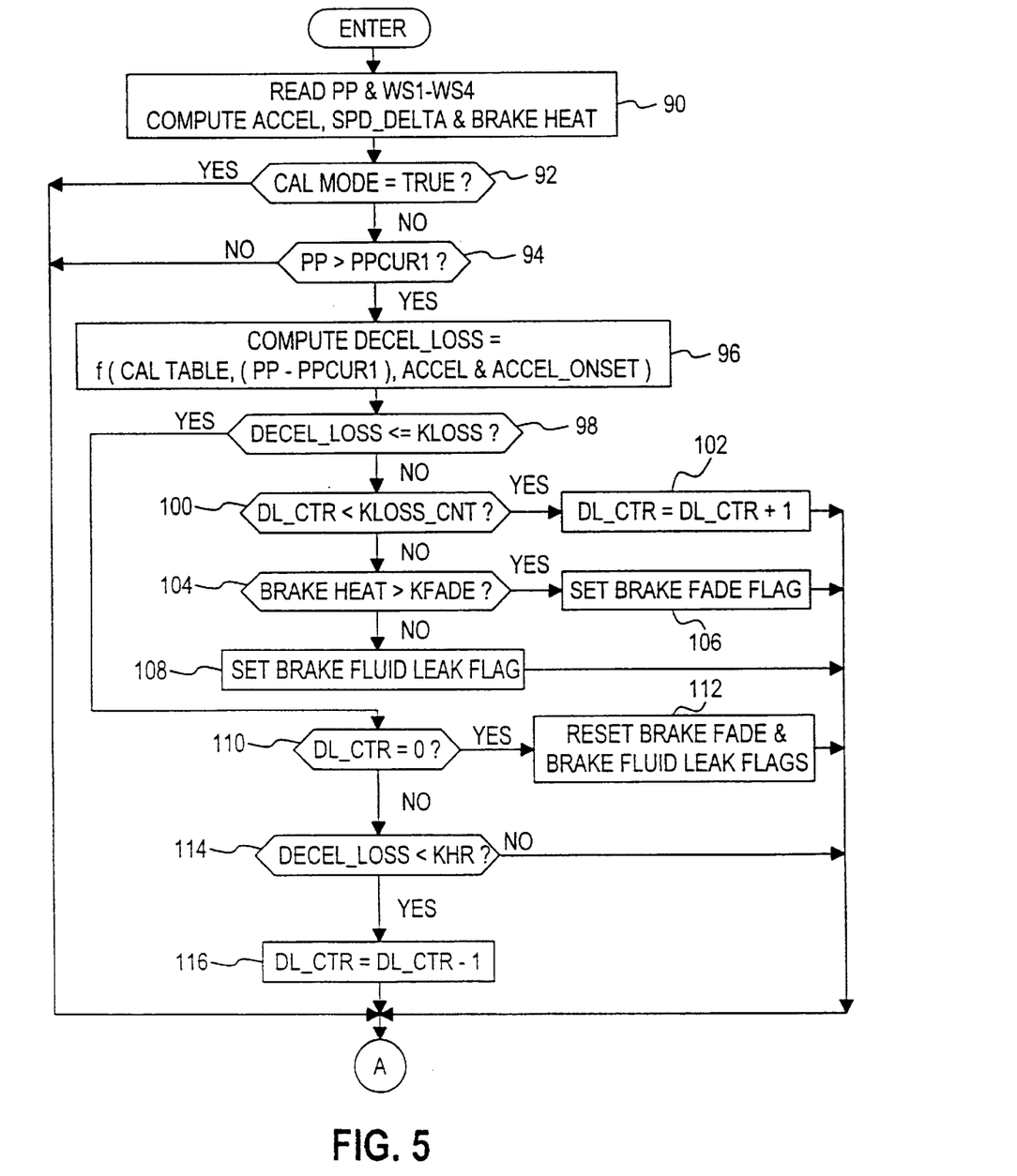
FIGS. 5, 6, 7 and 8 together depict a flow diagram representative of a computer program routine executed by the control unit of FIG. 1 in carrying out the diagnostic method of this invention.

Referring to FIG. 5, the input processing block 90 is first executed to read the brake pedal position PP and the wheel speeds, and to compute the vehicle acceleration ACCEL (compensated for road grade and vehicle weight) and the front-to-rear speed delta SPD_DELTA. Also, the vehicle acceleration when the brake pedal is initially depressed is saved as the onset acceleration ACCEL_ONSET, and a number of other brake-related parameters such as road grade, vehicle weight and the brake heat may be estimated as described, for example, in the aforementioned U.S. Pat. No. 6,212,458 to Walenty et al. The block 92 then determines if the calibration mode is in effect by checking the status of a CAL MODE FLAG. The CAL MODE FLAG is set to true to activate the calibration mode when the vehicle is new, and thereafter each time the braking system 10 is serviced. Thus, block 92 will initially be answered in the affirmative, signaling the execution of blocks 120–126, as indicated by the circled letter A, to determine if the braking condition is "normal" for purposes of brake data collection. Otherwise, the blocks 96–116 are executed to carry out the leak/fade detection test, provided that PP>PPCUR1, as determined at block 94.

Figure 6:
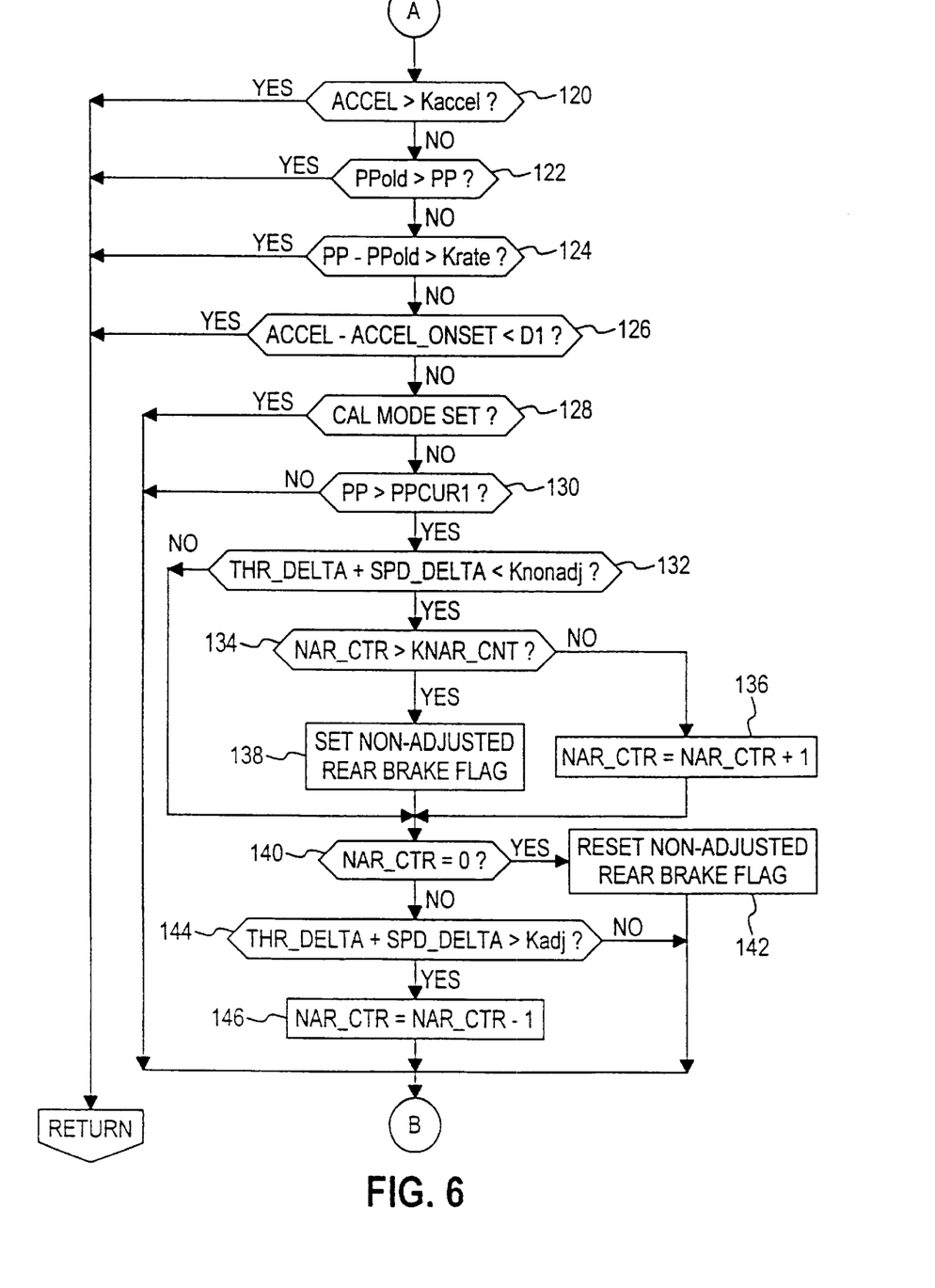
Figure 7:
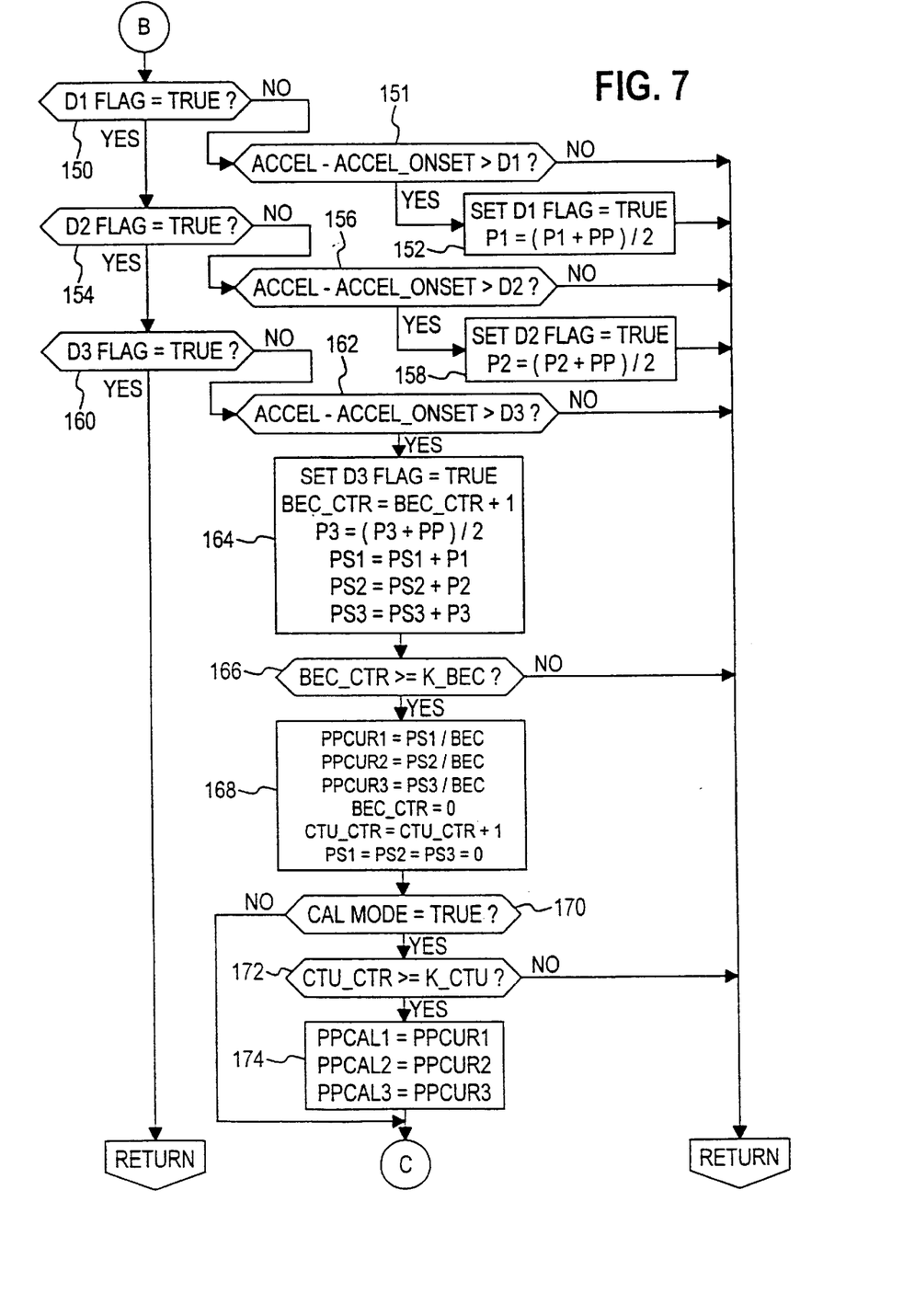
Figure 8:
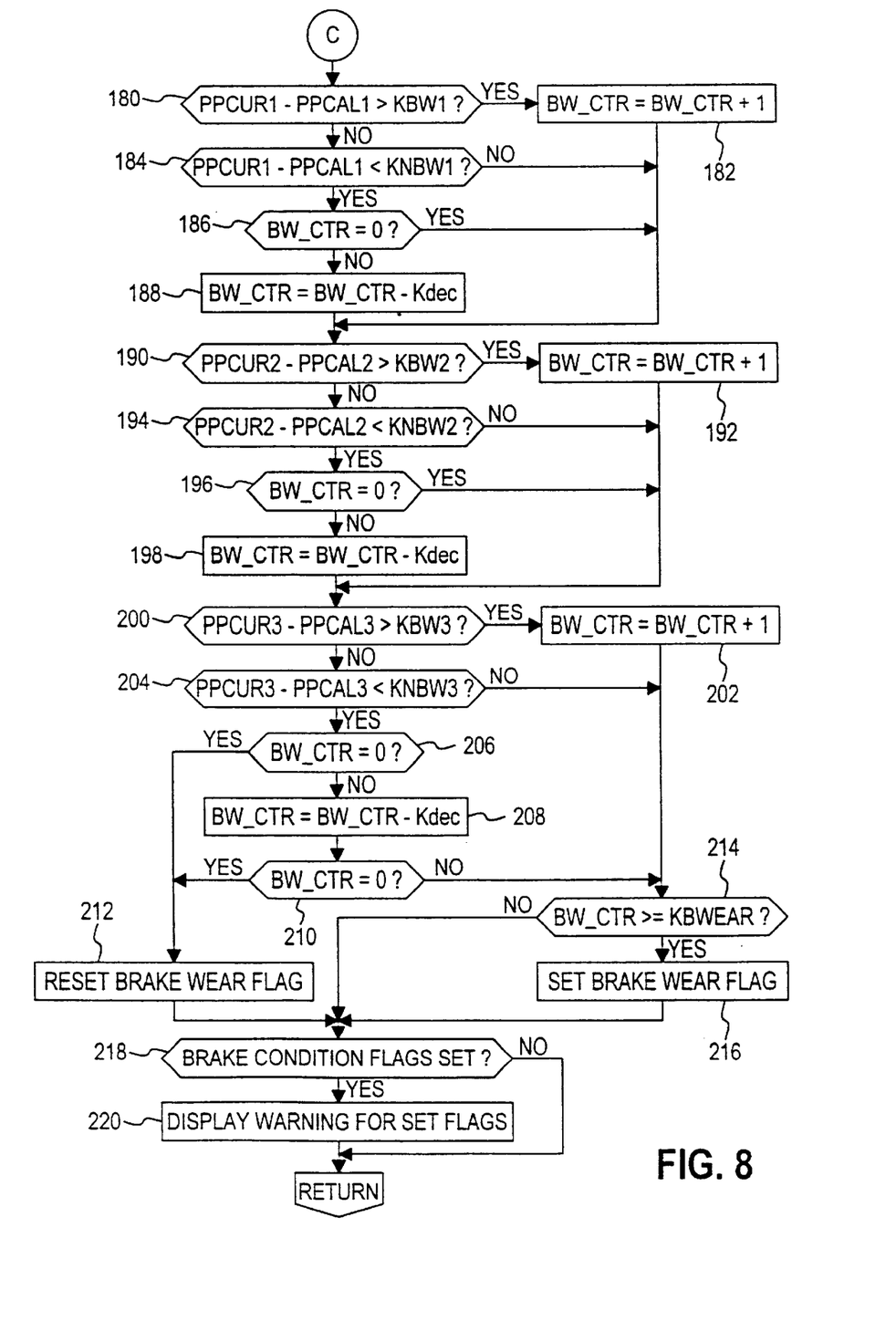

Referring to FIG. 6 and the data collection portion of the routine, the blocks 120–126 are first executed to determine if the current braking activity is suitable for data collection. Block 120 determines if ACCEL exceeds a relatively high threshold acceleration Kaccel, block 122 determines if the previous pedal position PPold is greater than the current value PP, block 124 determines if the difference (PP−PPold) exceeds a threshold rate Krate, and block 126 determines if the difference (ACCEL−ACCEL_ONSET) is less than the minimum deceleration table entry D1. Each of the blocks 120, 122, 124 and 126 must be answered in the negative to proceed with data collection; thus, a "normal" braking condition is defined as one in which (1) ACCEL<Kaccel, (2) PPold<PP, (3) PP−PPold<Krate, and (4) ACCEL−ACCEL_ ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 120–126 is answered in the affirmative, the routine is exited, as indicated. If all are answered in the negative, the current braking activity is considered to be suitable for data collection, and if block 128 determines that the CAL MODE FLAG is true, the control unit proceeds to block 150, as indicated by the circled letter B. Otherwise, the blocks 132–146 are executed to carry out the rear brake adjustment test, provided that PP>PPCUR1, as determined at block 130.

Figure 4:
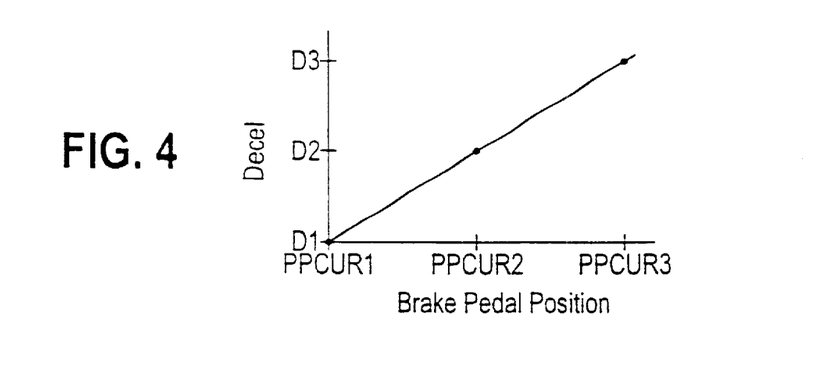
FIG. 4 is a graph depicting exemplary current brake effectiveness table data developed by the control unit of FIG. 1 according to this invention.

The data collection blocks 150–174 identify the brake pedal positions P1, P2, P3 corresponding to the respective predefined vehicle deceleration values D1, D2, D3, and construct current and calibration tables corresponding to those depicted in FIGS. 3 and 4. The blocks 150, 154 and 160 respectively determine if the pedal positions P1, P2 and P3 have been identified, based on the status of the D1 FLAG, the D2 FLAG and the D3 FLAG. If block 150 determines that the D1 FLAG is not true, the block 151 determines if the difference (ACCEL−ACCEL_ONSET) has reached the predefined deceleration value identified in FIG. 3 as D1. If not, the routine is exited; if so, the block 152 sets the D1 FLAG to true, and uses the current value of PP to update the pedal position variable P1 as shown. On the next execution of the routine, block 150 will be answered in the affirmative, and block 154 will determine if the D2 FLAG is true. If not, the block 156 determines if the difference (ACCEL− ACCEL_ONSET) has reached the predefined deceleration value identified in FIG. 3 as D2. If not, the routine is exited; if so, the block 158 sets the D2 FLAG to true, and uses the current value of PP to update the pedal position variable P2 as shown. On the next execution of the routine, blocks 150 and 154 will both be answered in the affirmative, and block 160 will determine if the D3 FLAG is true. If not, the block 162 determines if the difference (ACCEL−ACCEL_ ONSET) has reached the predefined deceleration value identified in FIG. 3 as D3. If not, the routine is exited; if so, the block 164 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 164 is not executed, and any pedal position data collected is discarded. After each successful data collection, the block 166 compares the brake event counter BEC_CTR to a calibrated threshold K_BEC indicative of the number of braking events needed to construct a current deceleration vs. pedal position table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 168 is executed to calculate average pedal position values by dividing the respective position summation values PS1, PS2, PS3 by the brake event counter BEC_CTR, and to construct a current deceleration vs. pedal position table using the calculated values. In other words, PPCUR1 =PS1/BEC_CTR, PPCUR2 =PS2/BEC_CTR and PPCUR3=PS3/BEC_CTR. Block 168 also resets the brake event counter BEC_CTR and the position summation values PS1, PS2, PS3 to zero, and increments a current table update counter CTU_CTR. If the CAL MODE FLAG is set, as determined at block 170, the block 172 compares the current table update counter CTU_CTR to a calibrated threshold K_CTU (which may have a value of fifty, for example), where the product (K_BEC*K_CTU) is the number of braking events needed to construct the calibration deceleration vs. pedal position table. Thus, when block 172 is answered in the affirmative, the block 174 is executed to transfer the pedal position values of the current deceleration vs. pedal position table into the calibration pedal position table, to set the CAL MODE FLAG to false, and to reset the current table update counter CTU_CTR to zero. Once the CAL MODE FLAG has been set to false, the data collection blocks 150–168 will continue to be executed for the purpose of periodically updating the current deceleration vs. pedal position table, after which block 170 will be answered in the negative, enabling execution of the brake wear test portion of the routine (blocks 180–216).

The leak/fade test portion of the routine (blocks 96–116) is initialized at block 96 by computing a deceleration loss term DECEL_LOSS based on the current pedal position PP, the calibration deceleration vs. pedal position table, ACCEL_ONSET, and ACCEL. The amount by which PP exceeds PPCUR1 is used to determine an expected vehicle deceleration from the calibration table, which should be essentially equal to the difference (ACCEL−ACCEL_ONSET) when the braking effectiveness is unimpaired.

However, when the braking effectiveness is impaired, the expected vehicle deceleration will be greater than (ACCEL−ACCEL_ONSET), so that DECEL_LOSS provides a measure of braking degradation. If DECEL_LOSS exceeds a threshold KLOSS, as determined at block 98, the blocks 100 and 102 increment a deceleration loss counter DL_CTR unless the count has reached a calibrated threshold KLOSS_CNT. Once DL_CTR reaches KLOSS_CNT—that is, once DECEL_LOSS has exceeded KLOSS for a calibrated time—block 100 is answered in the negative, and blocks 104–108 are executed to determine if the impaired braking effectiveness is due to a hydraulic leak or brake fading. If the estimated brake heat exceeds a calibrated value KFADE (corresponding to a brake temperature of 500° C., for example), as determined at block 104, the block 106 is executed to set a BRAKE FADE FLAG. Otherwise, the block 108 is executed to set a BRAKE FLUID LEAK FLAG. If DECEL_LOSS is less than or equal to KLOSS, and DL_CTR is zero, the block 112 resets the BRAKE FADE FLAG and the BRAKE FLUID LEAK FLAG. If DL_CTR is greater than zero, and DECEL_LOSS is less than a calibrated threshold KHR which is lower than KLOSS, the block 116 decrements DL_CTR. Thus, if the deceleration due to braking is less than the expected deceleration by at least a predefined amount (KLOSS) for at least a predefined time (defined by KLOSS_CNT), the BRAKE FADE FLAG or the BRAKE FLUID LEAK FLAG is set to indicate the respective brake system failure.

The rear brake adjustment test portion of the routine (blocks 132–146) involves comparing the front-to-rear speed delta SPD DELTA to pedal position-dependent threshold THR_DELTA, defined as (PP−PPCUR1)*Kgain, where Kgain is a predefined gain factor. As either or both of the rear wheel brakes 18, 20 go out of adjustment, SPD_DELTA will become more and more negative, and when the sum of SPD_DELTA and THR_DELTA falls below a threshold Knonadj, as determined at block 132, the blocks 134 and 136 increment a non-adjusting rear counter NAR_CTR unless the count has reached a calibrated threshold KNAR_CNT. Once NAR_CTR reaches KNAR_CNT—that is, the sum of SPD_DELTA and THR_DELTA falls below a threshold Knonadj for a calibrated time—block 134 is answered in the affirmative, and blocks 138 is executed to set the NON_ADJUSTED REAR BRAKE FLAG. The block 146 decrements NAR_CTR whenever when the sum of SPD_DELTA and THR_DELTA exceeds the threshold Kadj, and the blocks 140–142 reset the NON_ADJUSTED REAR BRAKE FLAG when NAR_CTR is zero.

The brake wear test portion of the routine (blocks 180–216) essentially determines if the brake pedal 30 must be depressed further than normal to achieve a given vehicle deceleration by comparing the pedal positions of the just-constructed current deceleration vs. pedal position table with the corresponding pedal positions from the calibration table. If the pedal position values from the current table exceed the corresponding values from the calibration table by predefined calibration amounts, a brake wear counter BW_CTR is incremented. Thus, blocks 180–182 increment BW_CTR if (PPCUR1−PPCAL1)>KBW1, blocks 190–192 increment BW_CTR if (PPCUR2−PPCAL2)>KBW2, and blocks 200–202 increment BW_CTR if (PPCUR3−PPCAL3)>KBW3, where KBW1, KBW2 and KBW3 are the predefined calibration amounts. If the pedal position values from the current table are within a calibration amount of the pedal position values from the current table, the brake wear counter BW_CTR is decremented by Kdec if BW_CTR is not already zero. Thus, blocks 184, 186, 188 decrement BW_CTR toward zero if (PPCUR1−PPCAL1)<KNBW1, blocks 194, 196, 198 decrement BW_CTR toward zero if (PPCUR2−PPCAL2)<KNBW2, and blocks 204, 206, 208 decrement BW_CTR toward zero if (PPCUR3−PPCAL3)<KNBW3, where KNBW1, KNBW2 and KNBW3 are calibration amounts indicative of no brake wear. If the execution of blocks 180–208 results in a BW_CTR value of zero, as determined at blocks 206 and 210, the block 212 is executed to reset the BRAKE WEAR FLAG. On the other hand, if block 214 determines that BW_CTR exceeds a threshold KBWEAR, the block 216 sets the BRAKE WEAR FLAG.

Finally, the blocks 218 and 220 are executed to check the brake condition flags and to display messages corresponding to any flags that are set on the driver information device 82. Such flags include the BRAKE FLUID LEAK FLAG, the BRAKE FADE FLAG, the NON-ADJUSTED REAR BRAKE FLAG and the BRAKE WEAR FLAG. Of course, if the conditions responsible for the sensed braking impairment are corrected, the various flags will automatically reset, as explained above. Also, as mentioned above, the driver warning may be supplemented by signaling the vehicle transmission controller to initiate an aggressive downshift schedule to supplement the vehicle deceleration due to application of the service brakes.

In summary, the control of this invention provides a reliable and cost-effective way of diagnosing brake system abnormalities by monitoring the deceleration vs. brake pedal position relationship over the life of the braking system. While described in reference to the illustrated embodiment, it is expected that various modifications in addition to those mentioned above will occur to those skilled in the art. For example, the control is applicable to braking systems that do not include anti-lock modulators, so long as the wheel speed sensors or some other means for determining the vehicle deceleration (such as an acceleration sensor, for example) are available. Thus, it will be understood that the scope of this invention is not limited to the illustrated embodiment, and that diagnostic methods incorporating these and other modifications may fall within the scope of this invention, which is defined by the appended claims.

What is claimed is:

1. A method of diagnosing an operation of a motor vehicle braking system including a driver positioned brake pedal, the method comprising the steps of:

periodically measuring vehicle deceleration and a brake pedal position during activation of the braking system;

storing calibration brake effectiveness data characterizing a relationship between the measured vehicle deceleration and measured brake pedal position during a calibration interval;

periodically storing current brake effectiveness data characterizing the relationship between the measured vehicle deceleration and measured brake pedal position during a diagnostic interval subsequent to said calibration interval; and diagnosing abnormalities that impair the operation of the braking system based on the stored data.

2. The method of claim 1, wherein the vehicle includes front and rear wheels, the braking system includes rear wheel brakes that require periodic adjustment, and the method includes the steps of:

measuring speeds of the front and rear wheels; and diagnosing a condition of non-adjusted rear wheel brakes when the speed of the rear wheels exceeds the speed of the front wheels by a reference value for at least a predefined time interval.

3. The method of claim 2, wherein the reference value varies as a function of the measured brake pedal position.

4. The method of claim 1, including the step of:

suspending the steps of storing the calibration and current brake effectiveness data if the measured vehicle deceleration exceeds a predefined threshold.

5. The method of claim 1, including the step of:

suspending the steps of storing the calibration and current brake effectiveness data when the measured brake pedal position decreases during the braking system activation.

6. The method of claim 1, including the step of disabling the steps of storing the calibration and current brake effectiveness data when the measured brake pedal position increases at a rate in excess of a reference rate.

7. The method of claim 1, including the step of:

disabling the steps of storing the calibration and current brake effectiveness data if the measured vehicle deceleration is less than a predefined threshold.

8. The method of claim 1, including the step of compensating the measured vehicle deceleration based on a vehicle deceleration in effect prior to activation of the braking system.

9. The method of claim 1, wherein the step of storing the calibration brake effectiveness data is repeated after servicing of the vehicle braking system.

10. The method of claim 1, wherein the stored current brake effectiveness data is determined by averaging measured brake pedal position values corresponding to predefined vehicle deceleration levels during a first predefined number of braking system activations.

11. The method of claim 10, wherein the stored calibration brake effectiveness data is determined by averaging measured brake pedal position values corresponding to predefined vehicle deceleration levels during a second predefined number of braking system activations which is greater than said first predefined number.

12. The method of claim 1, wherein the step of diagnosing abnormalities includes the steps of:

determining an expected vehicle deceleration from the calibration brake effectiveness data based on a measured brake pedal position value;

computing a deceleration loss based on a difference between the measured vehicle deceleration and the expected vehicle deceleration when the measured vehicle deceleration is less than the expected vehicle deceleration ; and diagnosing impaired operation of the braking system when the computed deceleration loss exceeds a loss threshold for a predefined time interval.

13. The method of claim 12, wherein the step of diagnosing impaired operation of the braking system includes the steps of:

determining a braking system temperature; and diagnosing a condition of brake fading when the computed deceleration loss exceeds the loss threshold for a predefined time interval and the determined braking system temperature exceeds a threshold temperature.

14. The method of claim 13, wherein the step of diagnosing impaired operation of the braking system includes the step of:

diagnosing a condition of brake fluid leakage when the computed deceleration loss exceeds the loss threshold for a predefined time interval and the determined braking system temperature is less than the threshold temperature.

15. The method of claim 12, including the steps of:

periodically incrementing a counter when the computed deceleration loss exceeds the loss threshold;

periodically decrementing the counter when the computed deceleration loss is below a secondary threshold which is lower than said loss threshold; and diagnosing impaired operation of the braking system when the counter reaches a value corresponding to said predefined time interval.

16. The method of claim 15, including the step of:

resetting the diagnosis of impaired operation when said counter is decremented to a zero threshold.

17. The method of claim 1, wherein the step of diagnosing abnormalities includes the steps of:

comparing the calibration brake effectiveness data to the current brake effectiveness data to determine a brake wear value when the current brake effectiveness data indicates less braking effectiveness than the calibration brake effectiveness data; and diagnosing a condition of brake wear when the determined brake wear value exceeds a brake wear threshold for a predefined time interval.

18. The method of claim 17, wherein the calibration and current brake effectiveness data include measured brake pedal positions corresponding to predefined vehicle deceleration values, and the method includes the steps of:

retrieving brake pedal positions from the calibration and current brake effectiveness data for at least one vehicle deceleration value;

comparing the retrieved brake pedal positions, and determining the brake wear value based on a difference between the retrieved brake pedal positions when the brake pedal position retrieved from the current brake effectiveness data is greater than the brake pedal position retrieved from the calibration brake effectiveness data.

19. The method of claim 18, including the steps of:

periodically incrementing a counter when the determined brake wear value exceeds the brake wear threshold;

periodically decrementing the counter when the determined brake wear value falls below the brake wear threshold; and diagnosing the condition of brake wear when the counter reaches a value corresponding to said predefined time interval.

20. The method of claim 19, wherein the steps of retrieving and comparing brake pedal positions and periodically incrementing and decrementing the counter are repeated for each of a plurality of vehicle deceleration values.

21. The method of claim 19, including the step of:

resetting the diagnosis of the condition of brake wear when said counter is decremented to a zero threshold.

* * * * *